No. 885,162. PATENTED APR. 21, 1908.
H. W. KIRCHNER.
FREIGHT CAR.
APPLICATION FILED APR. 1, 1907.
3 SHEETS—SHEET 1.
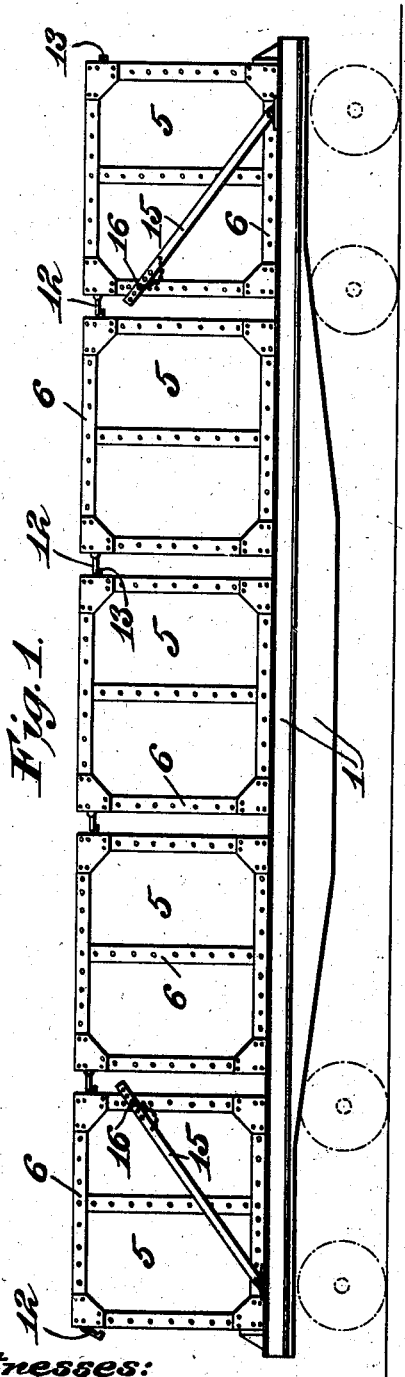
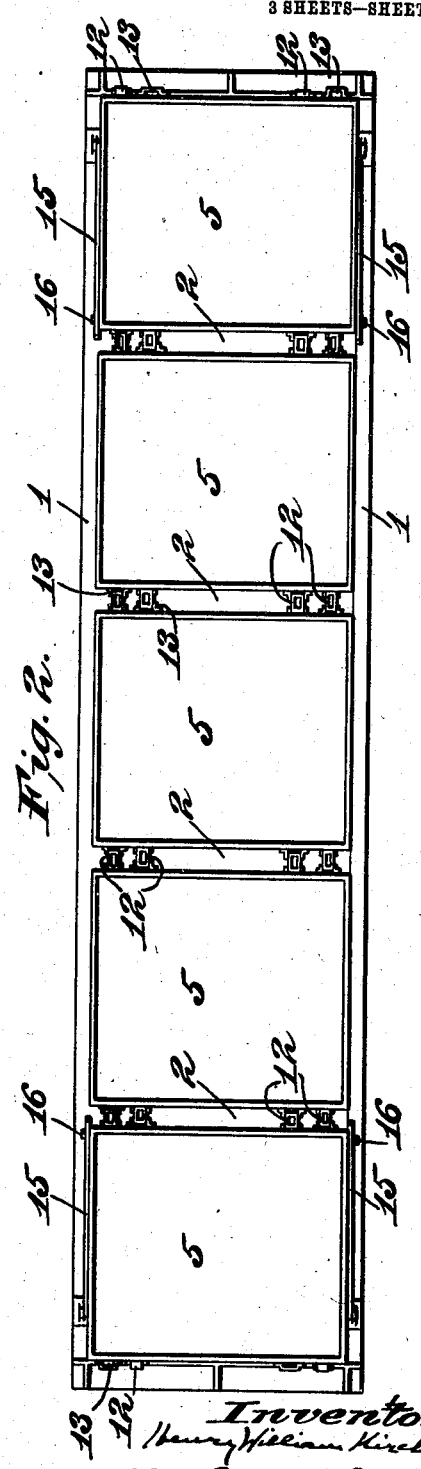
Witnesses:
G. A. Pennington
J. B. McGown
Inventor:
Henry William Kirchner
By Carr & Carr
Attys.

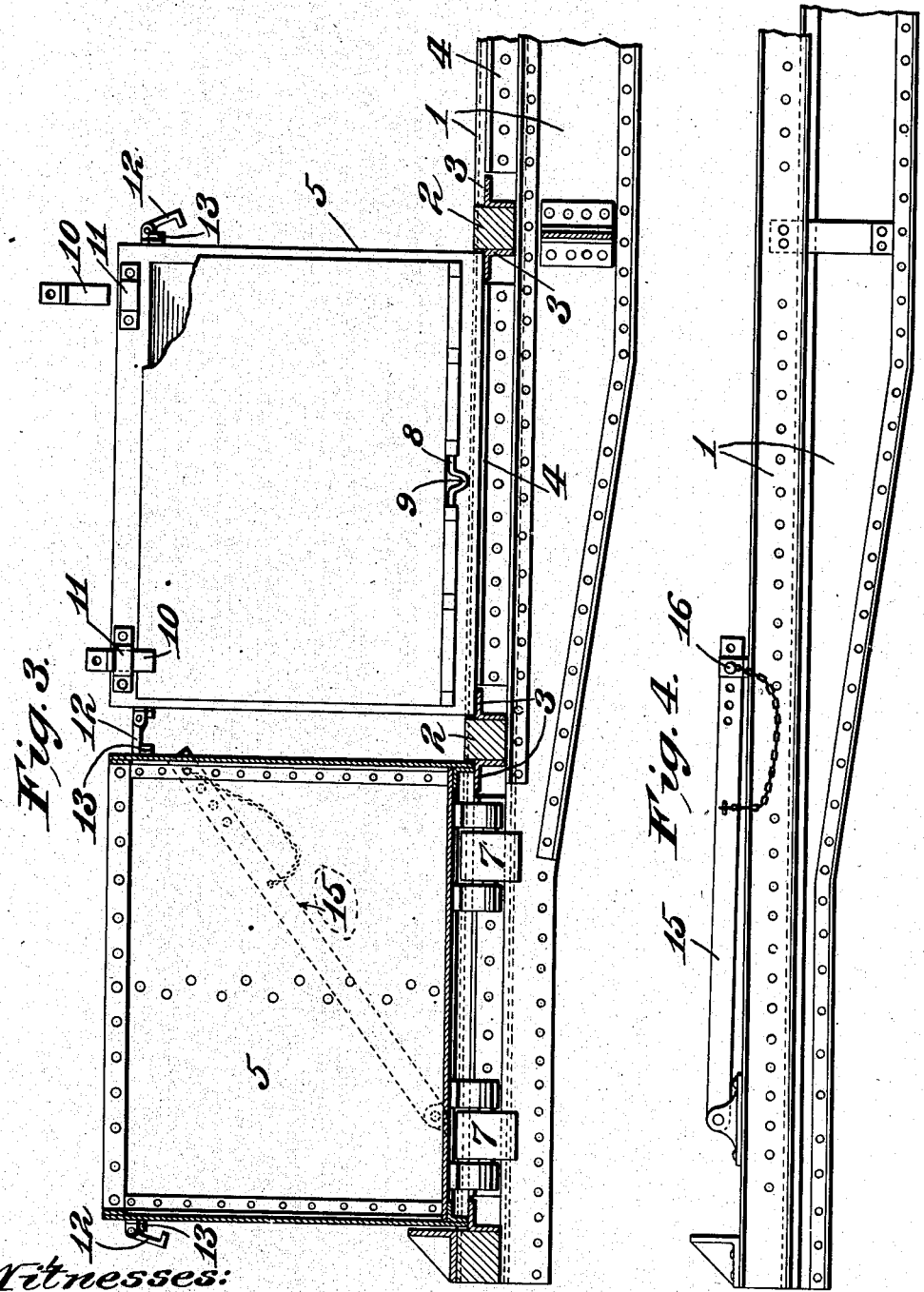

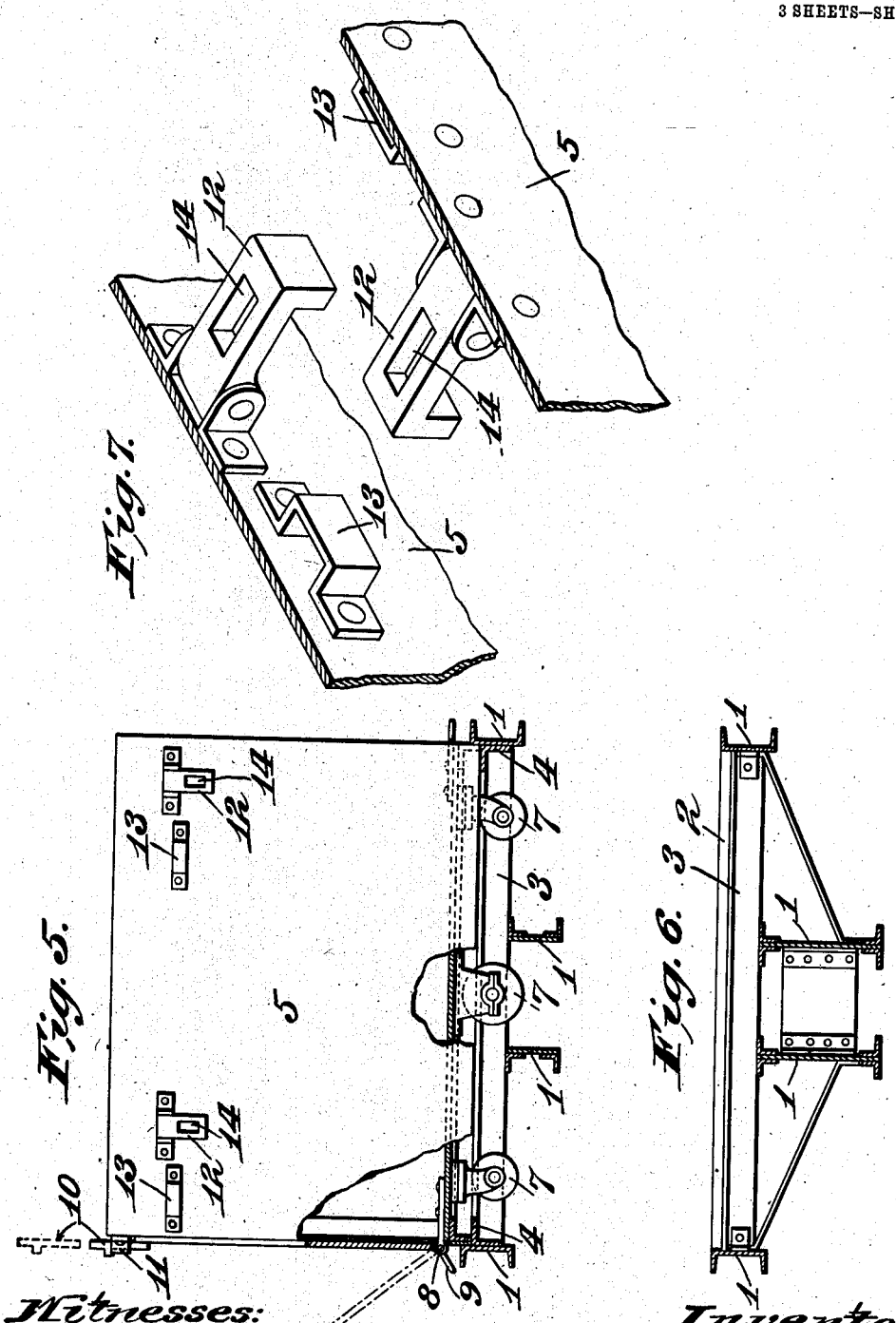

UNITED STATES PATENT OFFICE.

HENRY WILLIAM KIRCHNER, OF ST. LOUIS, MISSOURI, ASSIGNOR TO RIVER & RAIL TRANSPORTATION COMPANY, OF GUTHRIE, OKLAHOMA, A CORPORATION OF OKLAHOMA.

FREIGHT-CAR.

No. 885,162.   Specification of Letters Patent.   Patented April 21, 1908.

Application filed April 1, 1907. Serial No. 365,793.

*To all whom it may concern:*

Be it known that I, HENRY WILLIAM KIRCHNER, a citizen of the United States, and a resident of the city of St. Louis and State of Missouri, have invented a new and useful Improvement in Freight-Cars, of which the following is a specification.

My invention relates to freight cars and has for its principal objects to provide freight holding compartments or unit boxes which may be removably mounted on a freight car and may be interchangeable with each other and with similar unit boxes of other cars.

My invention consists in the parts and in the arrangements and combinations of parts hereinafter described and claimed.

In the accompanying drawing, which forms part of this specification, and wherein like symbols refer to like parts wherever they occur, Figure 1 is a side elevation of a car embodying my invention; Fig. 2 is a plan view thereof; Fig. 3 is an enlarged view of the end portion of a car partly in elevation and partly in vertical section with two units in position; Fig. 4 is an enlarged elevation of the end portion of a car with the freight units removed; Fig. 5 is a cross section of the car showing one of the freight units partly in elevation and partly in section; Fig. 6 is a cross-section of the body of the car with the freight units removed; and, Fig. 7 is an enlarged detail view showing the locking devices of adjacent freight units.

The body of the car comprises a platform or skeleton frame mounted upon suitable wheeled trucks. The longitudinal girders or sills 1 of the car support transverse members 2 whose sides are equipped with angle bars 3. The side sills also are provided with angle bars 4 flush with the angle bars of the transverse members. By this arrangement, the side sills and the cross members form a series of rectangular pockets, from each side of which extends a flange of an angle bar. The horizontal or laterally extending members or flanges of the angle bars are below the upper surface of the sills and constitute a marginal seat or vertical support for a box. The lower end of the box is surrounded by the upper portions of the sills, which constitute lateral supports to retain such box in place against forces tending to displace it horizontally.

Resting removably upon the extending flanges of the angle bars of each pocket or compartment is a rectangular box 5 of proper dimensions to enter the pocket or compartment and be supported by the marginal angle bars. The several boxes of the car are of the same size and shape, so that every box may coöperate with every pocket, as desired. So, too, the several cars are built alike, so that the several boxes of one car are not only interchangeable with each other but are likewise interchangeable with the boxes of other cars.

The several boxes are preferably wooden boxes of rectangular shape strongly built and reinforced with metal 6 along their edges, sides and corners. Preferably, the boxes are provided with casters, rollers or wheels 7 on their bottoms, whereby, when they are removed from the car, they may be easily rolled or shifted. When the boxes are in position on the car, the wheels or casters hang therefrom.

Preferably, the boxes are open at the top and have one or more sides hinged to facilitate the loading and unloading thereof, as shown in Figs. 3 and 5. It is desirable to hinge the side near the bottom by means of a pintle 8 which extends parallel with the axes of the rollers and is provided with a loop 9 whereby a hook or draft appliance may be attached thereto to facilitate the hauling of the box. The hinged side of the box is preferably made of hinged sections and is held in place by suitable fastening devices. As illustrated in Fig. 3, the hinged side is held in place by vertical bolts 10 extending downwardly through a keeper 11 mounted on the frame of the box.

Each of the boxes constitutes a freight unit and is provided on its ends with interlocking members adapted to coöperate with interlocking members on the next adjacent unit. For this purpose, the locking members are preferably arranged in two sets on each of two sides of the unit (that is, four sets in all); one member of each set being a latch or hook 12 and the other member a keeper 13. For the sake of interchangeability, the distance between the latch and the keeper of each box is uniform, and the keeper of each set is uniformly to the right (or to the left, as the case may be) of the keeper of its set, as one faces them. Otherwise stated, the latches are similarly arranged with respect to the vertical axis of the box, so that, if the box is turned end for end, the latch on either side thereof will coöperate equally well with the keeper of the adjacent box; and in like manner the keepers also are similarly arranged. The length of the latches is likewise uniform and such as to engage with the keeper of the box or unit in the next adjacent compartment or pocket of the car. The latches thus constitute spacing members or distance pieces as well as fastening devices. These latches are preferably formed with holes 14 through them of such dimensions as to coöperate with a grab hook or hanger of a derrick, whereby the boxes or units can be readily lifted out of their pockets on the car. Near the end of the car, the body is provided with long pivoted bars 15 whose free ends have holes adapted for locking bolts 16 to pass through. The box or freight unit has bolt holes in the upper portion of its side. When the pivotal bar is fastened by means of bolts extending through it into the upper inner portion of the end box or unit, said box or unit is held firmly in place thereby. At the end of each pocket the car is provided with a raised or elevated abutment adapted to prevent endwise movement or tilting of the end boxes. The intermediate boxes or freight units are locked to each other by means of the latches, so that they coöperate with each other to increase the stability of the whole.

Obviously, the construction hereinbefore described admits of considerable modification without departing from my invention. Thus, instead of the interchangeable units fitting in rectangular pockets as described, the seats for said boxes or units may be otherwise formed to retain said boxes or units against displacement. So, too, the interchangeable units may be completely inclosed instead of being open at the top, and their fastening devices may be varied, as desired. Instead of ordinary wheels or casters under the boxes or units, said units may be equipped with flanged wheels suitable for narrow-gage tracks.

What I claim as my invention and desire to secure by Letters Patent is:

1. A freight car comprising a body having a plurality of seats for boxes and a plurality of boxes removably mounted on said seats, said car having a skeleton body comprising longitudinal and transverse members arranged to inclose the lower portion of said boxes and constitute lateral supports therefor.

2. A freight car comprising a body having a plurality of seats for boxes and a plurality of boxes removably mounted on said seats, said car having a skeleton body comprising longitudinal and transverse members arranged to inclose the lower portion of said boxes and to constitute lateral supports therefor, and means for anchoring said boxes in position.

3. A freight car comprising a body portion having pockets therein, a plurality of removable boxes adapted to fit in said pockets and means for anchoring said boxes in position, said means comprising fastening devices for fastening the boxes to each other and inclined links for securing the upper portion of the end boxes to the end portion of the body of the car.

4. A freight car comprising a body having a plurality of seats for boxes and a plurality of boxes removably mounted on said seats, said car having a skeleton body comprising longitudinal and transverse members arranged to inclose the lower portions of said boxes and to constitute lateral supports therefor, said boxes being secured together by detachable fastening devices.

5. A freight car comprising a body having a series of box retaining seats, and a plurality of interchangeable boxes removably mounted on said seats, said boxes having fastening devices on two opposite sides arranged to coöperate with similarly arranged fastening devices upon adjacent boxes.

6. A freight car comprising a body having box retaining seats and a plurality of interchangeable boxes removably mounted on said seats, each box having sets of fastening devices arranged on two opposite sides to coöperate with similar fastening devices on adjacent boxes a fastening device adjacent to one end of a side being the counterpart of the fastening device adjacent to the other end thereof and the fastening devices of opposite sides being similarly arranged.

7. A freight car comprising a body having box-retaining seats and a plurality of interchangeable boxes removably mounted on said seats, each box having sets of fastening devices arranged to coöperate with similarly arranged counterpart fastening devices on adjacent boxes, and each set of fastening devices comprising a pivotally mounted hook and a hook keeper.

8. A freight car comprising a body having longitudinal members and transverse members arranged to form pockets with box-retaining seats and a plurality of wheeled boxes removably mounted on said seats.

9. A freight car comprising a body having box-retaining seats and a plurality of boxes removably mounted on said seats, and link bars pivoted on said body near the ends thereof, and means for fastening said link bars to the endmost boxes to anchor them in place.

10. A plurality of similar freight cars which comprise a body having box retaining seats and a plurality of boxes adapted to be removably mounted on said seats, the several boxes being interchangeable and the body comprising longitudinal members and transverse members arranged to inclose the lower ends of the boxes and constitute lateral supports therefor.

11. An interchangeable box unit for freight cars comprising a box having fastening devices on opposite sides so formed and arranged that the fasteners of both sides may coöperate interchangeably with those of a similar box.

12. An interchangeable box unit for freight cars having four sets of similarly arranged fastening devices on opposite sides, each set comprising a pivotal hook and a hook keeper.

13. An interchangeable box unit for freight cars having four sets of similarly arranged fastening devices on opposite sides, each set comprising a pivotal hook and a hook keeper, one side of said box being pivoted near the bottom.

14. A freight car comprising longitudinal members and transverse members having inwardly extending flanges arranged to constitute pockets with marginal supports therein for boxes.

15. A freight car comprising a body having a plurality of seats for boxes and a plurality of boxes mounted on said seats and means on the respective boxes for fastening said boxes to one another to coöperate in retaining said boxes in position, said means being adapted to coöperate with lifting devices.

Signed at St. Louis, Missouri, this 30th day of March, 1907, in the presence of two subscribing witnesses.

HENRY WILLIAM KIRCHNER.

Witnesses:
JAMES A. CARR,
JULIA B. MEGOWN.